J. BERGH.
TRACTION WHEEL.
APPLICATION FILED MAR. 22, 1916.
1,198,098.
Patented Sept. 12, 1916.
2 SHEETS—SHEET 1.
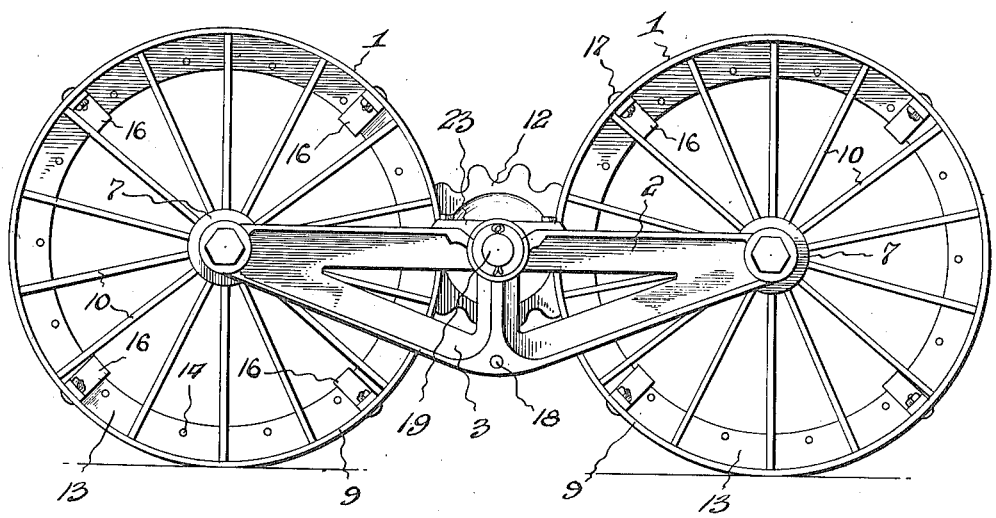
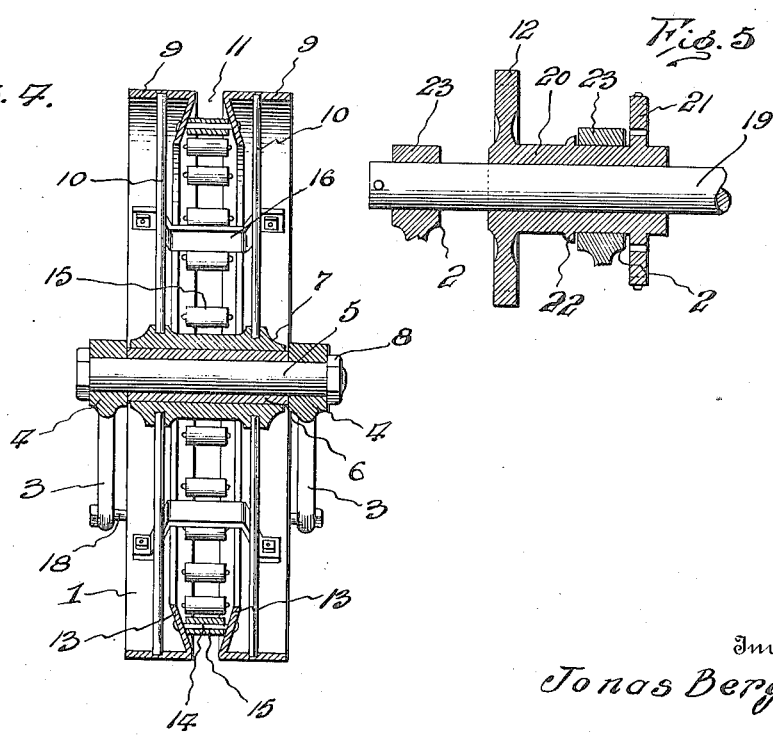
Inventor
Jonas Bergh.
By
Attorney J. BERGH.
TRACTION WHEEL.
APPLICATION FILED MAR. 22, 1916.
1,198,098.
Patented Sept. 12, 1916.
2 SHEETS—SHEET 2.
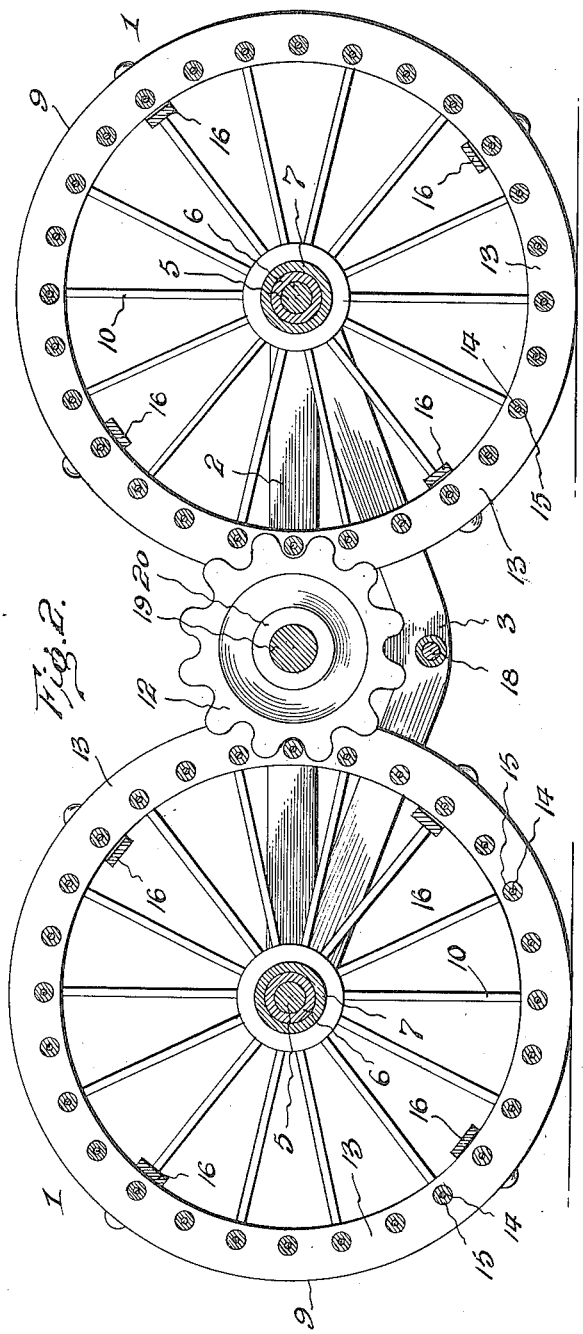
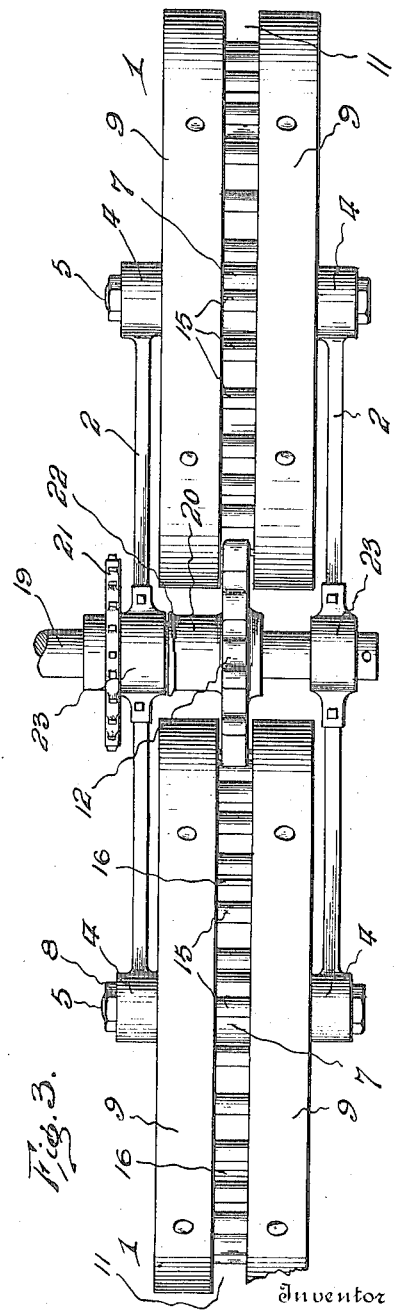
Inventor
Jonas Bergh.

UNITED STATES PATENT OFFICE.

JONAS BERGH, OF EAU CLAIRE, WISCONSIN.

TRACTION-WHEEL.

1,198,098. Specification of Letters Patent. Patented Sept. 12, 1916.

Application filed March 22, 1916. Serial No. 85,929.

*To all whom it may concern:*

Be it known that I, JONAS BERGH, a citizen of the United States, residing at Eau Claire, in the county of Eau Claire and State of Wisconsin, have invented certain new and useful Improvements in Traction-Wheels, of which the following is a specification.

This invention relates to traction wheels and has for its primary object the provision of a novel construction and arrangement of parts whereby the power of the engine is applied simultaneously to two ground engaging wheels which are so mounted as to have play in a vertical plane whereby the machine may travel over rough roads without disturbing the level position of the platform or main frame.

A further object of the invention is to provide a novel arrangement of parts whereby the power will be applied with minimum loss to the ground engaging wheels, and also provide a novel construction whereby any stones or other objects which may be taken up by the ground engaging wheels will readily find their way out of the same instead of lodging therein and tending to damage some of the parts.

The invention is illustrated in the accompanying drawings and consists in certain novel features which will be particularly pointed out in the claims following the description.

In the drawings,—Figure 1 is an elevation of the traction wheels embodying my invention; Fig. 2 is an enlarged longitudinal section; Fig. 3 is a plan view; Fig. 4 is a transverse section through one of the ground engaging wheels; Fig. 5 is a detail section through the driving pinion and the supporting rod for the same.

In carrying out my invention, I employ two ground engaging wheels 1, which are arranged in alinement and are pivotally supported by and between the ends of beams 2, which are preferably constructed with depending strut or truss portions 3, as shown, the supporting beams being thus given the strength necessary to withstand the severe strains to which the device is subjected in use without unnecessarily increasing the weight of the apparatus. These beams are provided at their ends with eyes 4 and through the said eyes, I insert bolts 5 which constitute the axles for the ground engaging wheels. A bushing 6 is inserted between the axle and the hub 7 of the wheel and the ends of this bushing are caused to bear against the inner opposed faces of the eyes 4 so as to be held against longitudinal movement upon the axle. Nuts 8 upon the ends of the axles retain the same in the eyes 4, as will be readily understood. Each ground engaging wheel comprises a pair of annular rim or tread members 9 which are supported from the hubs 7 by spokes 10 and are spaced apart to provide a central annular slot or open space 11 which receives the edge of the driving gear wheel 12. The spokes 10 may be secured in place in any desired manner and at the inner edge of each tread member is an internal annular flange or rib 13 and pins 14 are secured in and carried by the said ribs or flanges, the said pins bridging the space between the flanges and being equipped with rollers 15, as shown. The pins and rollers are spaced equi-distantly around the wheel and constitute cogs which are engaged by the teeth or spurs of the gear 12 in the operation of the machine, as will be readily understood on reference to Fig. 2. Upon reference to Fig. 4 it will be readily noted that the flanges or ribs 13 diverge or flare inwardly so that if the wheel in its contact with the surface of the ground should pick up a stone or other object such stone or object would drop from between the flanges as the rotation of the wheel carries the object to a higher point, and, as the sides of the wheel are open, the object will, of course, quickly be ejected so that it can not increase the dead weight of the machine nor tend to damage any of the parts of the wheel. The members of the wheel are held in their proper spaced relation by yokes or arched braces 16 which have their central portions passed across the planes of the flanges 13 but spaced inwardly somewhat therefrom and have their ends secured rigidly to the rim or tread members 9. The heads of the bolts 17 by which the said braces are secured in place may serve as projections to engage the ground and aid in imparting the necessary tractive qualities to the wheel but it is to be understood that any form of permanent or detachable traction lug may be used.

The central low points of the trusses 3 are connected by a bolt or similar device 18 and in the centers of the trussed beams 2 are openings through which I insert the ends of a rod or supporting bar 19, the said rod or bar serving also as the support for the main frame of the engine or other vehicle. It will be readily understood that the ends of this rod or supporting bar 19 should be cylindrical so as to permit a pivotal or swinging movement of the beams thereupon but the intermediate portion of the rod may be angular or otherwise constructed and will be rigidly secured in brackets depending from the main frame or otherwise connected to said frame so as to firmly support the same. The manner of connecting the rod to the main frame of the vehicle, however, forms no part of the present invention and is, therefore, not illustrated in the accompanying drawings. Upon the ends of the said rod 19 I mount a sleeve 20 which has the gear wheel 12 formed on or rigidly secured to its outer end and is provided near its inner end with a sprocket wheel 21 around which is trained a sprocket chain whereby power may be transmitted to the pinion from the differential shaft of the motor. Instead of the sprocket pinion 21 a spur wheel may be employed, as will be readily understood. Between the ends of the sleeve 20 is an annular rib or shoulder 22, and the bearing of the inner main supporting beam engages around the sleeve 20 between the said shoulder and the pinion 22, as shown most clearly in Fig. 5. Upon reference to Figs. 1 and 3 it will be noted that the bearings are composed of recesses or notches, formed in the upper sides of the beams, and cap plates 23 bolted upon the beams so as to extend over the said recesses or notches and engage the rod 19. Lateral or end-wise movement of the sleeve 20 and the gears carried thereby will be prevented by the shoulder 22 and the pinion 21 engaging the opposite sides of the supporting beam 2 so that the gear wheel 12 will always be properly alined with the annular slots or open spaces of the ground engaging wheels.

The operation of the device is thought to be obvious from the foregoing description, taken in connection with the accompanying drawings. Power is applied to the sleeve or hub member 20 and the said member with the gear wheel 12, consequently rotated. The rotation of the gear wheel 12 will be transmitted directly to the ground engaging wheels 1 inasmuch as the teeth or spurs of the said gear mesh with the rollers or cogs 15 of the ground wheels. It will, of course, be noted that the wheels may be rotated in either direction so that the machine may be driven forward or backward. Should the advance wheel strike an obstruction or sink into a rut the vertical movement of the same will not be transmitted to the main frame of the vehicle so as to impart a violent shock to the same but the vertical movement of the wheel in riding over the obstruction or through the rut or hole will be accommodated by the pivotal mounting of the beams 2 upon the supporting rod 19 and as the pivotal center of the beams is also the center of rotation of the driving gear 12, the propelling force will be applied to the ground wheels constantly notwithstanding any vertical vibration of the same. The rollers 15 minimize the wear between the cogs of the wheel 12 and the ground engaging wheels and the bushings 6 also facilitate the adjustment of the wheels to compensate for wear inasmuch as a worn bushing may be removed and a new one substituted therefor in a very few minutes. The device is exceedingly simple in the construction and arrangement of its parts and will be found highly efficient in use.

Having thus described the invention, what is claimed as new is:—

1. In an apparatus for the purpose set forth, the combination of a stationary supporting rod, ground-engaging wheels disposed in radial alinement at opposite sides of said rod, supports for said wheels pivotally mounted on said rod, a sleeve loosely fitted on said rod to rotate about the same, a gear carried by said sleeve and operatively engaging the ground engaging wheels, and means for effecting engagement between said sleeve and one of the said supports to prevent end-wise movement of the sleeve.

2. In an apparatus for the purpose set forth, the combination of a supporting rod, a sleeve fitted thereon to rotate about the same and having an annular shoulder intermediate its ends, a gear wheel on one end of said sleeve, a pinion on the opposite end of said sleeve, ground wheels disposed in radial alinement at opposite sides of said supporting rod and operatively engaged by said gear wheel, and beams pivotally mounted on said rod and having their ends pivotally supporting the ground wheels, one of said beams fitting around the sleeve between the rib and the pinion thereon.

3. In an apparatus for the purpose set forth, a ground wheel consisting of spaced annular tread members, inwardly diverging flanges projecting from the inner edges of said tread members, cogs carried by said flanges and bridging the space between the same, and means for acting on said cogs to rotate the wheel.

4. In an apparatus for the purpose set forth, a ground wheel comprising annular tread members spaced apart and provided at their inner opposed edges with inwardly extending flanges, cogs carried by and bridging the space between said flanges, arched braces having their intermediate portions extending across the inner edges of said flanges and their ends rigidly secured to the tread members, and means for engaging the cogs to rotate the wheel.

In testimony whereof I affix my signature.

JONAS BERGH. [L. S.]